US006897461B2

(12) United States Patent
Chen

(10) Patent No.: US 6,897,461 B2
(45) Date of Patent: May 24, 2005

(54) BILL SLOT PANEL FOR A VENDING MACHINE

(75) Inventor: Wei-Jr Chen, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 315 days.

(21) Appl. No.: 10/346,131

(22) Filed: Jan. 17, 2003

(65) Prior Publication Data

US 2004/0140441 A1 Jul. 22, 2004

(51) Int. Cl.[7] .................................................. G06K 7/10

(52) U.S. Cl. ....................... 250/556; 250/239; 194/207; 271/10.01

(58) Field of Search ................................ 250/239, 556, 250/557; 209/534; 194/205–207, 351; 221/2, 6, 7, 9, 123, 126, 211; 356/71; 700/231, 232; 705/16

(56) References Cited

U.S. PATENT DOCUMENTS

| | | | | | |
|---|---|---|---|---|---|
| 5,887,695 | A | * | 3/1999 | Hatamachi et al. | 194/207 |
| 5,907,141 | A | * | 5/1999 | Deaville et al. | 235/375 |
| 5,964,336 | A | * | 10/1999 | Itako et al. | 194/207 |
| 2002/0125627 | A1 | * | 9/2002 | Hand | 271/10.01 |

* cited by examiner

*Primary Examiner*—Stephone B. Allen
(74) *Attorney, Agent, or Firm*—Bacon & Thomas PLLC

(57) ABSTRACT

An improved bill slot panel for a vending machine is disclosed. The bill slot panel of the present invention comprises a light-transmitting element, which is installed at a bill slot entrance of a bill slot panel of the vending machine. The light-transmitting element picks up the light projected by a light source installed inside the bill slot panel to substantially illuminate the bill slot entrance.

7 Claims, 6 Drawing Sheets

BILL SLOT PANEL FOR A VENDING MACHINE

BACKGROUND OF THE INVENTION

1. The Field of the Invention

The present invention relates to a vending machine, and more particularly relates to an improved bill slot panel for a vending machine comprising a light-transmitting element, for picking up a light projected by a light source installed in an internal part of the bill slot panel to illuminate the bill slot entrance so that the visibility of the bill slot in the dark can be improved and insertion bills becomes more easier.

2. Description of the Related Art

Nowadays, vending machines with a bill slot are commonly used in the public places, for example, parking lots, metro stations, and the like. The design of a general bill slot panel comprises a bill-receiving roller device, positioned internally and a bill slot is installed at a frontal end of the bill-receiving roller device for feeding bills. When a user feeds a bill into the bill slot, the rolling device functions to roll the bill in, meanwhile, an identifying device functions to identify the real bill from the fake bill and roll the real bill into the bill collection canister. Such a kind of bill slot only accepts the bills that are smooth and flat in condition, if not, the bills will be rejected. Therefore, the user has to arrange the bill as smooth and flat as possible while feeding into the bill slot in order to meet this design. However, commonly, the bill slot is not designed to have a large entrance, the actual width of the entrance is merely slightly wider than the width of the bill. Thus feeding a bill into the entrance of the bill slot needs to be precise, while it may be comparatively easier to do so in the daylight or under bright light illumination, but however in the nighttime or in a dark location, it takes whole lot of work to arrange the bill as smooth, flat, and precise as required for feeding the bill into the entrance of the bill slot. This causes the users inconvenience.

SUMMARY OF THE INVENTION

Accordingly, in the view of the foregoing, the present inventors make a detailed study of related art to evaluate and consider, and uses years of accumulated experience in this field, and through several experiments, to create a new bill slot panel for vending machine. The present invention provides an innovated cost effective vending machine with improved bill slot panel to effectively improve the visibility of the bill slot in the dark and makes the insertion of the bill into the bill slot much more easier.

In accordance with the above objects and other advantages of the present invention as broadly embodied and described herein, an improved bill slot panel for vending machine is provided. The bill slot panel of the present invention comprises a light-transmitting element, which is installed at a bill slot entrance of a bill slot panel of the vending machine. The light-transmitting element picks up the light projected by a light source installed inside the bill slot panel to substantially illuminate the bill slot entrance.

According to an aspect of the present invention, because the light-transmitting element of the present invention can substantially illuminate the bill slot entrance, therefore the visibility of the bill slot in the dark can be effectively improved and makes the insertion of the bill into the bill slot much more easier.

According to another aspect of the present invention, the light-transmitting element of the present invention can be comprised of different colors to transmit the corresponding color of light for illuminating the bill slot entrance.

According to an aspect of the present invention, the light source of the sensor may be comprised of different colors using emitting elements of a variety of colors to project on the light-transmitting element. Alternatively, several emitting elements emitting various colors may be used to project on the light-transmitting element for emitting different colors according to the operation status of the vending machine for indicating the operation status of the vending machine to the user. Thus, this would indicate the user whether or not the vending machine is in the status for providing service.

According to another aspect of the present invention, the light-transmitting element can be comprised of a fluorescent material.

According to another aspect of the present invention, the light-transmitting element is inlayed by buckling within a chassis so that this design would allow replacement of the light-transmitting element. Accordingly, different types of emitting elements can be used to provide a variety of illumination effects.

BRIEF DESCRIPTION OF THE DRAWINGS

For a more complete understanding of the present invention, reference will now be made to the following detailed description of preferred embodiments taken in conjunction with the accompanying drawings, in which.

DETAILED DESCRIPTION OF THE PREFERRED EMBODIMENTS

Figure 1:
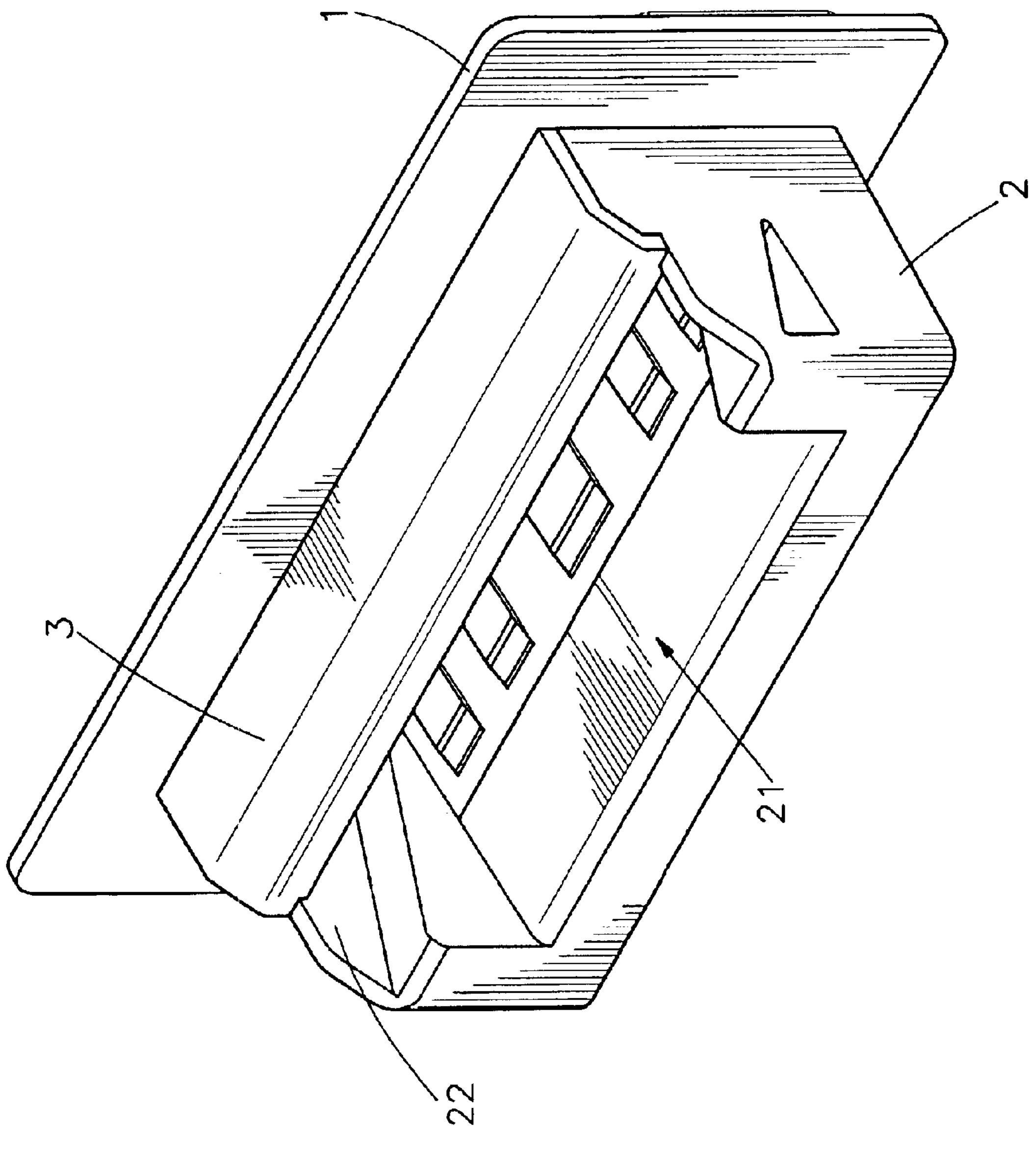
FIG. 1 is an elevational view of a structure of an assembly of a chassis with an improved bill slot panel of the present invention.

Reference will be made in detail to the preferred embodiments of the invention, examples of which are illustrated in the accompanying drawings. Wherever possible, the same reference numbers are used in the drawings and the description to refer to the same or like parts.

Figure 2:
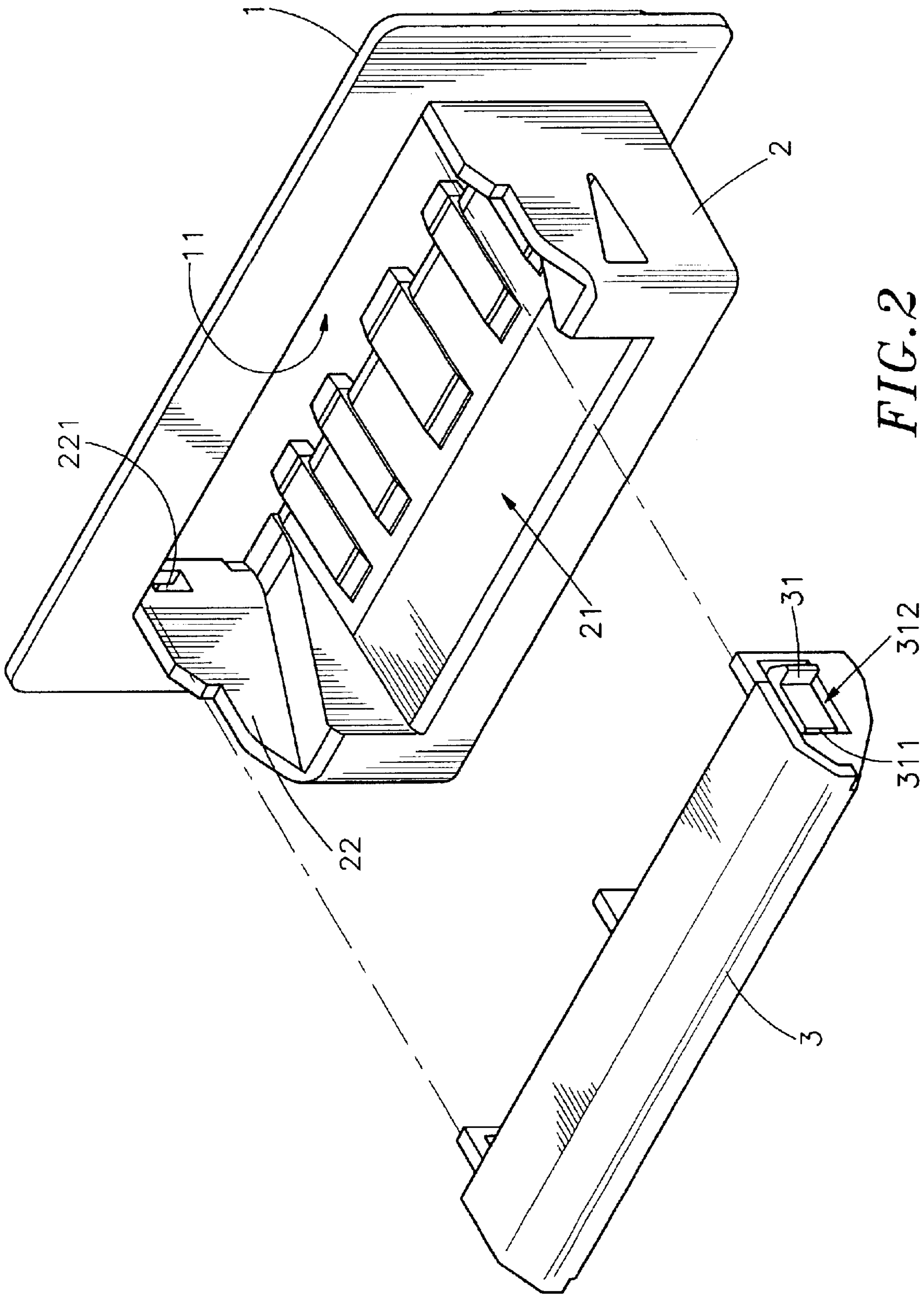
FIG. 2 is an exploded view of the assembly of the chassis with the improved bill slot panel of the present invention.
Figure 3:
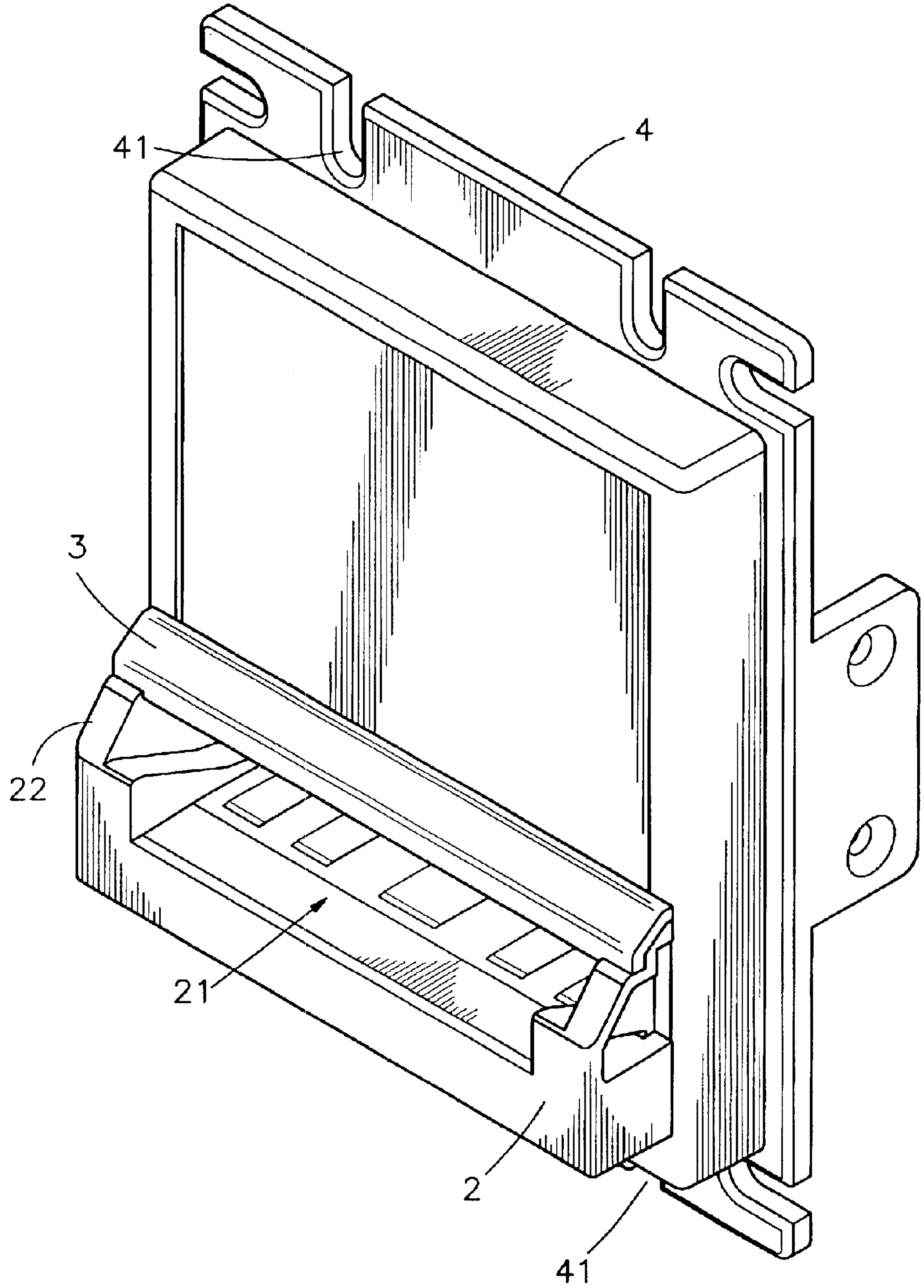
FIG. 3 is an elevational view of a structure of the assembly of the chassis with the improved bill slot panel assembled to a shield according to a preferred embodiment of the present invention.
Figure 4:
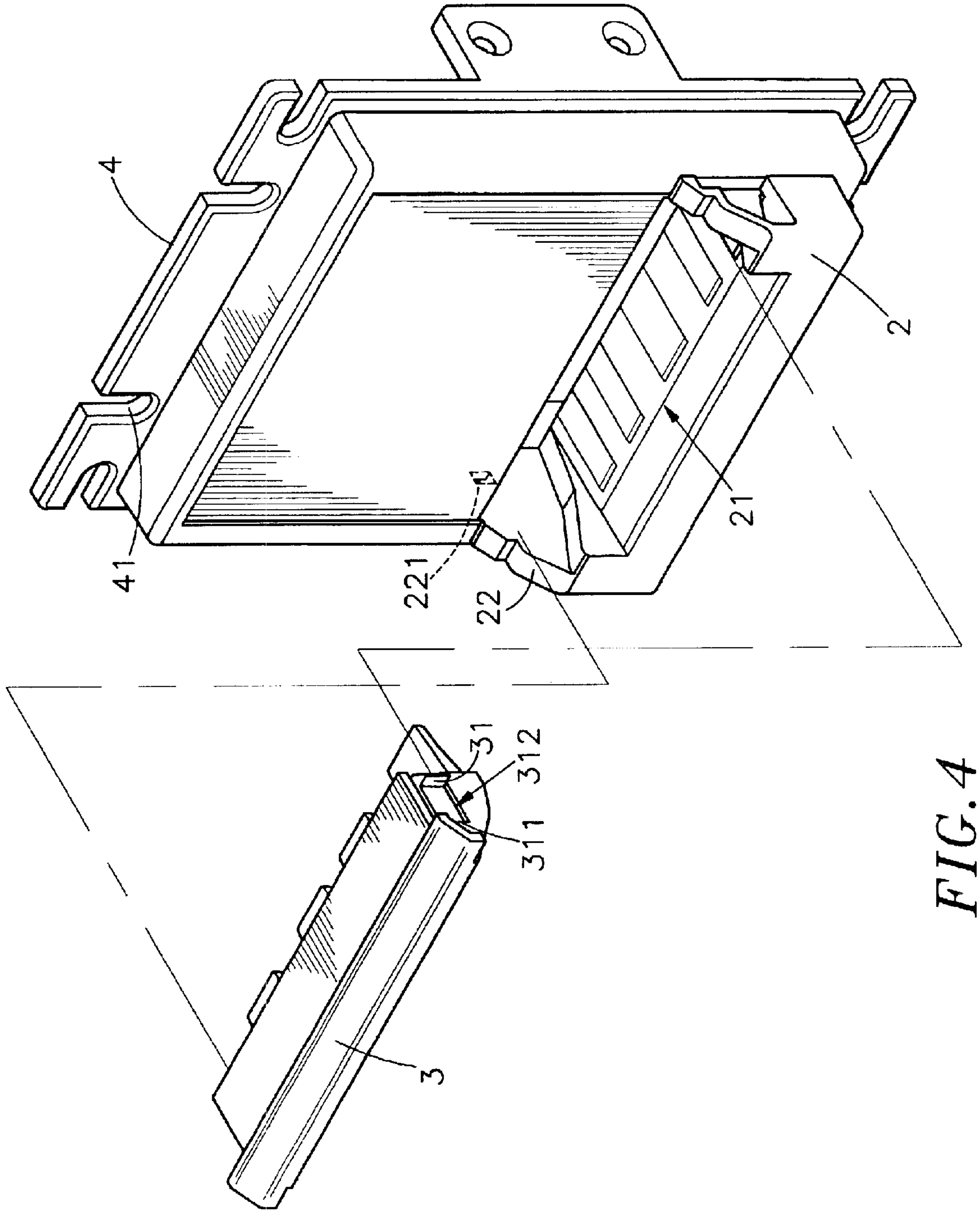
FIG. 4 is an exploded view of a structure of the assembly of the chassis with the improved bill slot panel assembled to a shield according to a preferred embodiment of the present invention.

Referring to FIGS. 1~2, show a structure of an assembly of a chassis of a vending machine with an improved bill slot panel of the present invention. The bill slot panel comprises a panel 1, a chassis 2, a bill slot entrance 21 and a light-transmitting element 3. The panel 1 comprises a bill slot 11. A U-shaped chassis 2 is attached to the bill slot 11 and supported by the chassis 1, and a bill slot entrance 21 is formed at an outer portion of the chassis 2. The chassis 2 comprises two sidewalls 22 which are close to the bill slot 11 and have inlaying grooves 221. The light-transmitting element 3 is positioned above the chassis 2, wherein the light-transmitting element 3 comprises a resilient element 31 on two sides thereof for buckling into the inlaying grooves 221 of the sidewalls 22 of the chassis 2 for fitting the light element 3 within the chassis 2.

The resilient element 31 has one distal end as connecting portion 311 for securing to the light-transmitting element 3, and a slit 312 surrounds the resilient element 31 for providing a better resiliency or elasticity to the resilient element 31.

Figure 5:
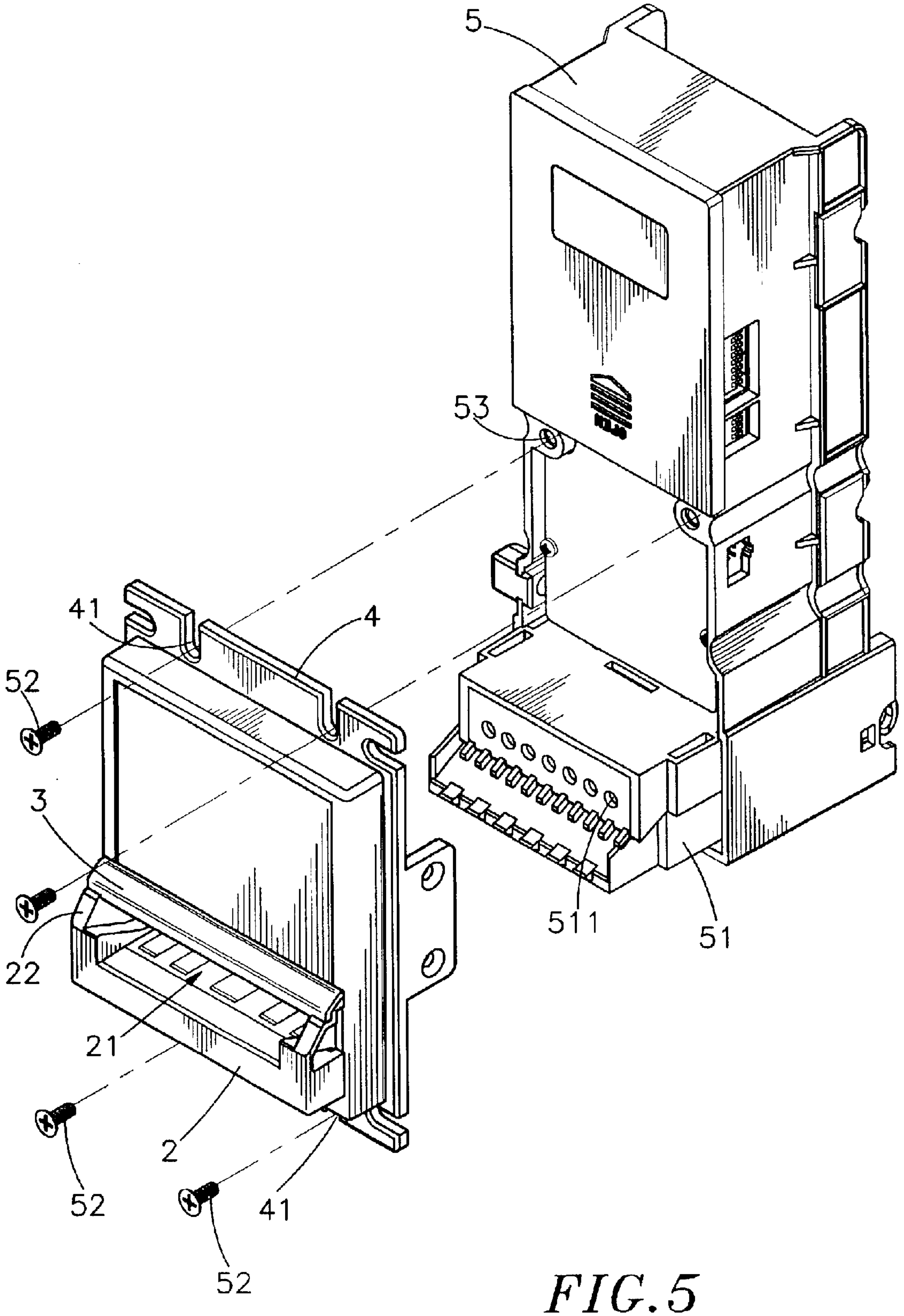
FIG. 5 is an exploded view of the assembly of the chassis with the improved bill slot panel assembled to a shield, and a bill-receiving roller device according to a preferred embodiment of the present invention.
Figure 6:
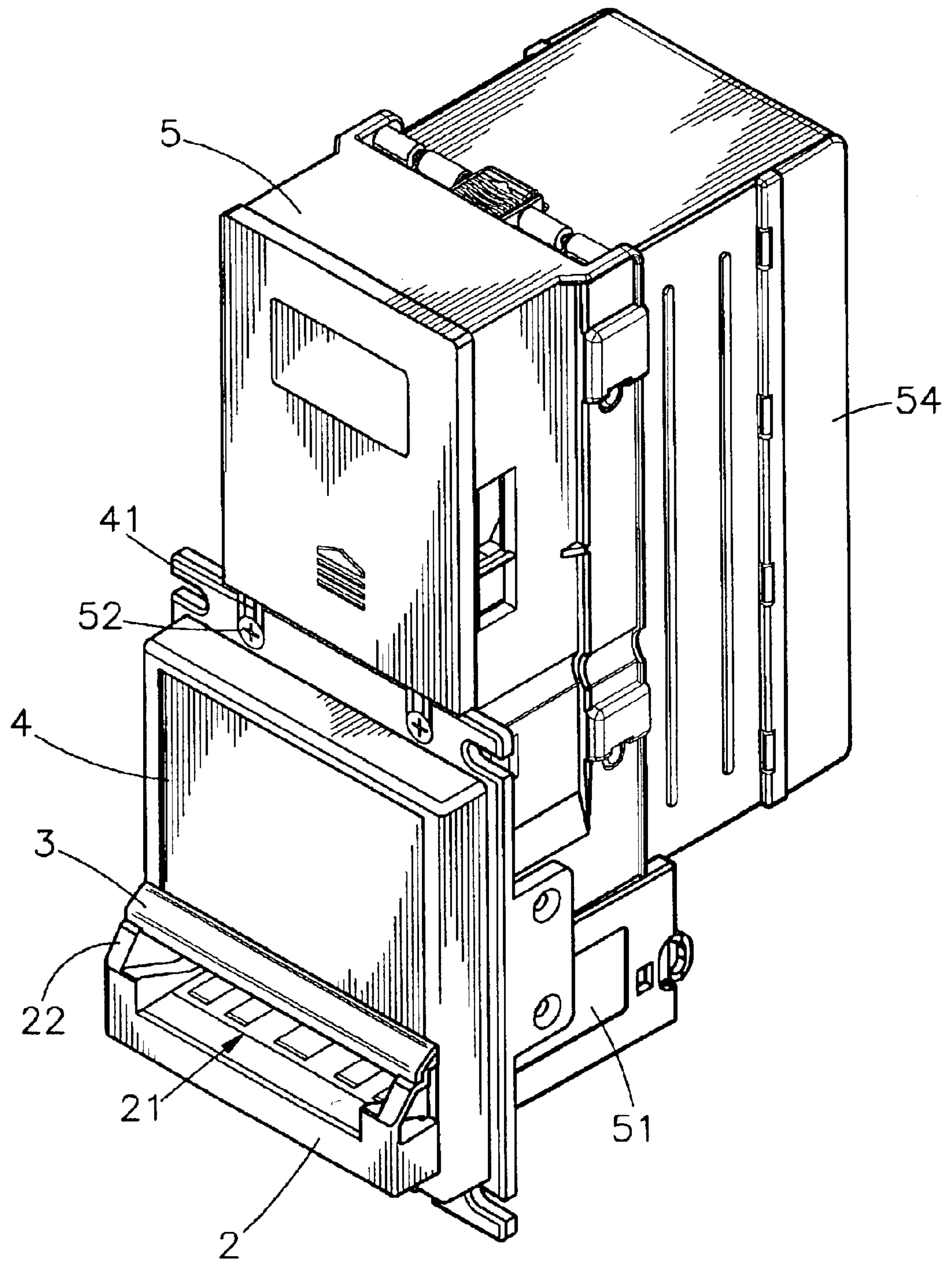
FIG. 6 is an elevational view of the assembly of the chassis with the improved bill slot panel assembled to a shield and the bill-receiving roller device of the present invention.

Referring to FIGS. 3~6, the chassis 2 comprising the light-transmitting element 3 inlayed thereof buckling into the inlaying grooves 221 using the resilient element 31 that is positioned on the two sidewalls 22 of the chassis 2, is secured at a lower frontal portion of a shield 4. The resilient element 31 that is positioned on each of the two sides of the light-transmitting element 3 have one distal end as connecting portion 311 for securing to the light-transmitting element 3 with the slit 312 surrounding the resilient element 31 for providing a better resiliency or elasticity to the resilient element 31, as described above, securely fixes the light-transmitting element 3 on the chassis 2. The light-transmitting element 3 and the shield 4 are positioned in front of a bill-receiving roller device 5, and covering the bill-receiving roller device 5, as shown in FIGS. 5~6. The bill slot entrance 21 of the chassis 2 is inlayed in front of a sensor 51 and a light source 511 is positioned on the sensor 51 aiming the inner part of the light-transmitting element 3 that is positioned above the bill slot entrance 21. A threaded element 52 may be used penetrate through the U-shaped indentation 41 of the frontal shield 4 and threaded into the threaded aperture 53 to fix the frontal shield 4 securely in front of the bill-receiving roller device 5. Finally a bill collection canister 54 is installed to complete the structure of the bill-receiving roller device 5.

The light from the light source 511 of the sensor 51, which is installed in front of the bill-receiving roller device 5, is projected on the light-transmitting element 3. The light-transmitting element 3 picks up the light and transmits the light at the bill slot entrance 21 to substantially illuminate the bill slot entrance 21. Because the light-transmitting element 3 of the present invention can substantially illuminate the bill slot entrance 21, therefore the visibility of the bill slot panel in the dark can be effectively improved and makes the insertion of the bill into the bill slot panel much more easier.

According to an aspect of the present invention, the light source 511 of the sensor 51 may be comprised of different colors using emitting elements of a variety of colors to project on the light-transmitting element 3. Alternatively, several emitting elements emitting various colors may be used to project on the light-transmitting element 3 for emitting different colors according to the operation status of the vending machine for indicating the operation status of the vending machine to the user. Thus, this would indicate the user whether or not the vending machine is in the status for providing service.

According to another aspect of the present invention, the light-transmitting element 3 can be comprised of a fluorescent material.

According to another aspect of the present invention, the light-transmitting element 3 is inlayed by buckling within the chassis 2 so that this design would allow replacement of the light-transmitting element 3. Accordingly, different types of emitting elements can be used to provide a variety of illumination effects.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What the invention claimed is:

1. An improved bill slot panel for a vending machine, comprising:

- a chassis, comprising a bill slot entrance formed at an outer portion thereof, wherein said bill slot entrance comprises a plurality of inlaying grooves formed on two sidewalls and a top portion thereof;
- a panel comprising a bill slot, wherein said bill slot is fixed to said chassis; and
- a light-transmitting element inlayed within said bill slot entrance by securing to said inlaying grooves of the chassis, wherein said light-transmitting element comprises a plurality of resilient elements on two sides thereof for buckling into said inlaying grooves of the chassis to fix said light-transmitting element on a top portion of said bill slot entrance.

2. The improved bill slot panel according to claim 1, wherein said resilient elements that are positioned on two sides of said light-transmitting element have one distal end as connecting portion for securing to the light-transmitting element thereof, and a slit surrounding the resilient element provides a resiliency to the light-transmitting element.

3. The improved bill slot panel according to claim 1, wherein said light-transmitting element is comprised of a fluorescent material.

4. The improved bill slot panel according to claim 1, wherein said chassis is securely fixed at a lower front portion of a shield, said light-transmitting element inlayed into said chassis, and said light-transmitting element and said shield are positioned in front of a bill-receiving roller device of a vending machine covering the bill-receiving roller device.

5. The improved bill slot panel according to claim 4, wherein said bill-receiving roller device comprises a sensor, and said sensor has a light source aiming an inner portion of said light-transmitting element positioned above said bill slot entrance for projecting light to said light-transmitting element.

6. The improved bill slot panel according to claim 1, wherein said light source of said sensor is comprised of a plurality of light emitters having a variety of colors for projecting corresponding colored lights to said light-transmitting element.

7. The improved bill slot panel according to claim 1, wherein said light source of said sensor can be applied with a variety of light emitters having several colors for projecting the corresponding colors to said light-transmitting element at a given time.

* * * * *